United States Patent [19]
Beatty et al.

[11] Patent Number: 5,449,864
[45] Date of Patent: Sep. 12, 1995

[54] MOTOR VEHICLE SCREENING APPARATUS AND METHOD

[76] Inventors: Jeffrey K. Beatty, 3655 Habersham Rd., NE., Apt. 129, Atlanta, Ga. 30305; Marian P. Tyree, Rte. 8, Box 432, Hwy. 257-Curry Rd., Jasper, Ala. 35501

[21] Appl. No.: 97,259

[22] Filed: Jul. 23, 1993

[51] Int. Cl.⁶ .................... G01G 19/40; G01G 19/52
[52] U.S. Cl. ................. 177/25.14; 177/25.19; 177/50; 177/134; 364/567
[58] Field of Search ............ 177/25.14, 25.19, 50, 177/134; 364/567

[56] References Cited

U.S. PATENT DOCUMENTS

| | | | |
|---|---|---|---|
| 3,842,922 | 10/1974 | Fagin et al. | 177/134 X |
| 4,192,394 | 3/1980 | Simpson | 177/134 X |
| 4,605,081 | 8/1986 | Helmly, Jr. et al. | 364/567 X |
| 5,054,207 | 10/1991 | Marshall | 33/600 |

Primary Examiner—Peter S. Wong
Assistant Examiner—Randy W. Gibson
Attorney, Agent, or Firm—Whitham, Curtis, Whitham & McGinn

[57] ABSTRACT

Vehicles are screened by weight for the presence of concealed explosive material, weapons, contraband and/or personnel by retrieving weight values for vehicles and categories of occupants and contents based on operator input and subtracting those values, as selections are made by an operator, from a measured vehicle weight. Excess weight is then compared to a specified tolerance, and the vehicle may be cleared or other appropriate action taken, including automatic control of movable barriers. The estimate of a weight value for various categories of vehicle occupants is adaptively altered to improve screening accuracy.

17 Claims, 2 Drawing Sheets

MOTOR VEHICLE SCREENING APPARATUS AND METHOD

BACKGROUND OF THE INVENTION

1. Field of the Invention

The present invention generally relates to security systems and, more particularly, to an apparatus and method for screening automobiles, including light trucks and vans, for concealed persons, explosives, contraband and other materials.

2. Description of the Prior Art

Motor vehicles such as automobiles, light trucks and vans have been used in many prohibited activities involving the transportation of persons or contraband such as in robberies and smuggling. More recently, such vehicles have also been utilized in terrorist activities such as in assaults and what has come to be known as car bombings in which a substantial amount of explosive material is concealed in the motor vehicle and the motor vehicle parked in a particular location and the explosives detonated, either with a timer or a remote control, such as a radio link.

Particularly in this latter case, the location chosen for a car bomb will often be a relatively crowded public place with a high volume of pedestrian and vehicular traffic. Public events will often be chosen where a large number of vehicles will be parked in an area with limited access such as parking lots. To gain closer access to crowded areas, vans and light trucks may be made to appear to be service vehicles having a legitimate reason for such access.

Given the probability of high traffic volume, there is a need to be able to screen vehicles for the presence of explosives at points of vehicular access to areas such as parking lots, service areas and the like. At the same time, however, such traffic must not be seriously impeded, particularly at scheduled events where admission fees are charged. The likelihood of public inconvenience in such circumstances can easily cause a major adverse effect on the commercial success of such events, particularly when the screening procedure is highly visible to the public. In this latter case, the public may infer that from such activities that terrorist activity is considered particularly likely or even that an actual threat of terrorism may have occurred.

It should be understood that, in some circumstances, high visibility of inspection or screening procedures may be considered desirable as a deterrent to prohibited activities such as terrorism. However, prior methods leave little flexibility to reduce visibility, should reduced visibility be desired and deleterious effects of visibility of inspection and screening methods on attendance at commercial events could not be avoided.

In this regard, the manual search of a suspect vehicle is often of high visibility. If a vehicle is suspected of carrying explosives or contraband, known detection techniques are often incapable of indicating any location within the vehicle where such materials are likely to be concealed, increasing the thoroughness of the search required and the visibility thereof to members of the public. The duration of such a thorough search may also make particular known screening systems objectionable even for relatively small numbers of false-positive detections.

To date, screening procedures for explosives carried in vehicles has concentrated on the constituent materials of the explosives, which commonly contain a high percentage of nitrates. Such material detecting procedures involve isolating the vehicle, sampling the air in or around it and analyzing the sampled air for nitrates or taking a surface sample of material around the hood, trunk or door areas of the vehicle for similar analysis for nitrate residues. These procedures take several minutes and are therefore not compatible with high volume traffic situations. The use of trained dogs for more rapid detection of explosive materials has been found to be insufficiently accurate as well as being highly visible and often intrusive.

Other techniques for detecting explosives and other items such as weapons and contraband have also focussed on highly advanced technology such as X-rays, so-called prompt gamma neutron analysis and the like. These techniques usually involve large and very expensive equipment and review of the results by highly trained personnel. Nevertheless, such techniques are subject to a high error or false-positive rate since the shape of any container for explosives or other items is substantially arbitrary and may be disguised to appear as other articles which would be expected to be present such as tires, drive shafts, hollow body panels and the like. The speed of detection is also generally insufficient to many situations which commonly occur.

The possibility of terrorist activities at particular events and the expense of any type of detection equipment also makes it desirable that the detection equipment be portable. Due to the size of motor vehicles to be screened, this is often not possible or at least very costly for X-ray equipment or the like. The need to isolate vehicles for nitrate analysis detection techniques also generally requires at least some sort of barriers or substantial size and weight. Therefore, prior detection techniques have required substantial costs to be incurred when equipment must be moved to screen vehicles at different events. The alternative is, of course, to provide a greater number of detection systems, often at great cost and inefficiency of utilization of such equipment.

Therefore, a need exists for a screening technique which is of reduced cost, improved portability, reduced visibility and of high accuracy. A need also exists for a screening technique for motor vehicles which will assist in the search of suspect vehicles by providing an indication of the location where contraband or explosives may be concealed therein.

SUMMARY OF THE INVENTION

It is therefore an object of the present invention to provide a screening method and apparatus for screening motor vehicles for concealed items or materials within a time comparable to normal entrance to a parking facility.

It is another object of the present invention to provide an apparatus which can provide an indication of the location within a vehicle where explosives, contraband or other material may be concealed.

It is a further object of the invention to provide for increased efficiency of use of other known vehicle screening and inspection techniques.

It is yet another object of the invention to provide a simple and effective screening apparatus and method which is independent of detection of chemical residues and is thus applicable to the detection of concealed personnel, weapons and contraband.

In order to accomplish these and other objects of the invention, there is provided, in combination, at least one weight transducer for measuring a weight of a vehicle, a data selection arrangement for selecting vehicle identification information and categories contents of a vehicle, a memory for providing weight values for each selection available, means for computing an excess weight value in response to the weight transducer and at least one weight value, and an arrangement for adaptively altering weight values in said memory corresponding to categories of vehicle contents.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
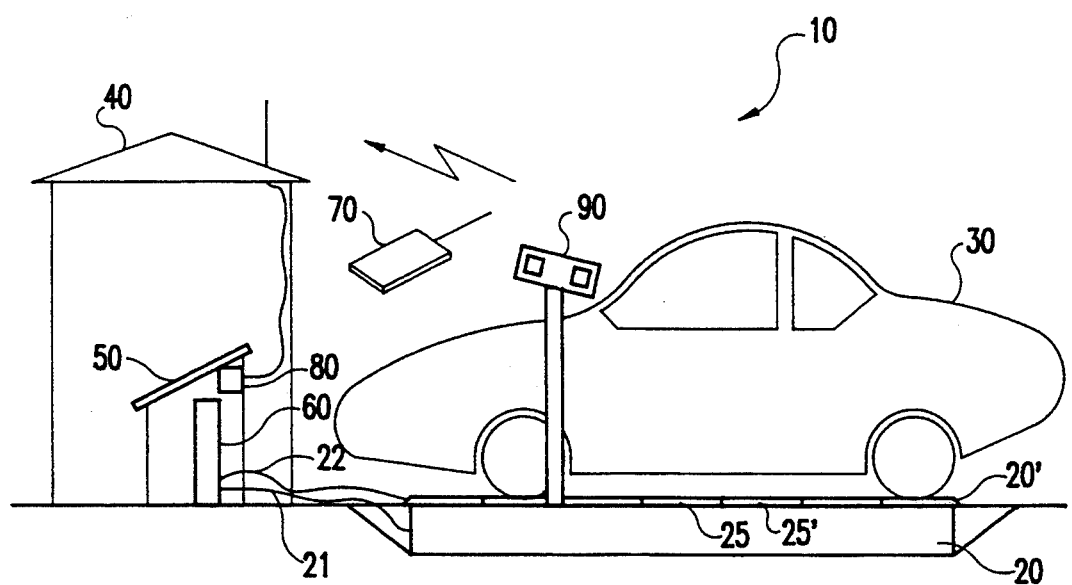
FIG. 1 is an overall view of the screening apparatus of the invention.

Referring now to the drawings, and more particularly to FIG. 1, there is shown an exemplary installation of the motor vehicle screening system 10 in accordance with the invention. While it is considered preferable that the invention be employed at a point of limited access to an area such as a parking lot, many locations such as border checkpoints would satisfy such criteria. Further, the invention may be used at any location where motor vehicles may travel such as city streets and the invention should not be considered to be limited to use in controlled access locations.

The basic approach to vehicle screening employed by the invention is weight comparison. This criteria is effective for screening of motor vehicles since it has been recognized by the inventors that 99% of car bombs which have been employed world-wide in the past have exceeded one hundred pounds in weight of explosive material. Conversely, even if so-called high-explosive materials or plastic explosives were to be employed, the damage resulting from the explosion of a significantly lesser weight of explosive material within the structure of an automobile would be relatively limited.

To achieve screening based on weight comparison within a time comparable to normal entrance to an area, the invention preferably includes a weight sensor pad preferably of a strain-gauge type which is, for example, commercially available from Powell All-Steel Scales, Inc. of Jasper, Ala., which manufactures vehicle scales of both permanently installed and portable types suitable for the practice of the invention. For high accuracy, scales which utilize a lever arrangement for transfer of load to a single load cell are preferred for use as scale 20. The load cell preferably employs a strain gauge type of sensor comprising generally a deformable array of resistive or piezo-electric elements and delivers an output voltage or current signal which is directly convertible to a digital signal by an appropriate digital to analog converter, the details of which are not important to the practice of the invention. Such types of weight detectors often provide accuracy of weight measurement within one pound or less even for vehicle weights running to several tens of tons.

In accordance with variations of the invention, a plurality of load cells 20', segmented as shown at 25, 25', may also be added to the platform of scale 20 as will be discussed below. Alternatively, for ease of portability, but with somewhat reduced accuracy, a plurality of load cells 20' could be used alone. As a compromise, for some installations, two or four separate scales 20 could be used in place of the combination of a single scale 20 platform with additional load cells 20'. However, for maximum flexibility of use, the use of a single platform scale 20, to which other sensors may be added, as desired, is preferred.

The outputs of scale 20 and/or pad segments 20' are preferably communicated by a wired digital link 21, 22 to a suitably programmed computer 60 which may be of the well-known personal computer type or a special purpose data processor. The computer 60 also receives inputs from a keyboard 50 which is preferably in the form of a flexible membrane type commonly used in point-of-sale terminals and having a separate key for each of a plurality of data input items. Use of a touch screen type of input device may also be used and may provide enhanced speed and convenience of data entry. The computer and keyboard are preferably housed in an enclosure 40 which may be constructed to provide physical protection for security personnel operating the system in accordance with the invention. An auxiliary portable keyboard 70, possibly in the form of a so-called pen computer may also be used to communicate with the computer 60 over a radio link including radio receiver and modem 80. Optionally, and in substitution for at least a portion of keyboard 50 and/or 70, a visual identification device (VID) 90, such as an optical measurement device and/or optical character recognition system, may also be included.

The screening system in accordance with the invention exploits the fact that curb weights of all commercially available motor vehicles are accurately known and that at least gross body types of vehicle occupants and size characteristics of other vehicle content for which weights may be reasonably estimated can be distinguished by trained personnel or other automated techniques such as optical recognition or measurement systems. In accordance with variations of the invention, knowledge of as-manufactured axle loadings for all commercially available vehicles is also taken into consideration. Further, in accordance with the invention, an adaptive processing arrangement is also provided in order to improve the estimation of body weight of vehicle occupants and the weight of other contents.

Figure 2:
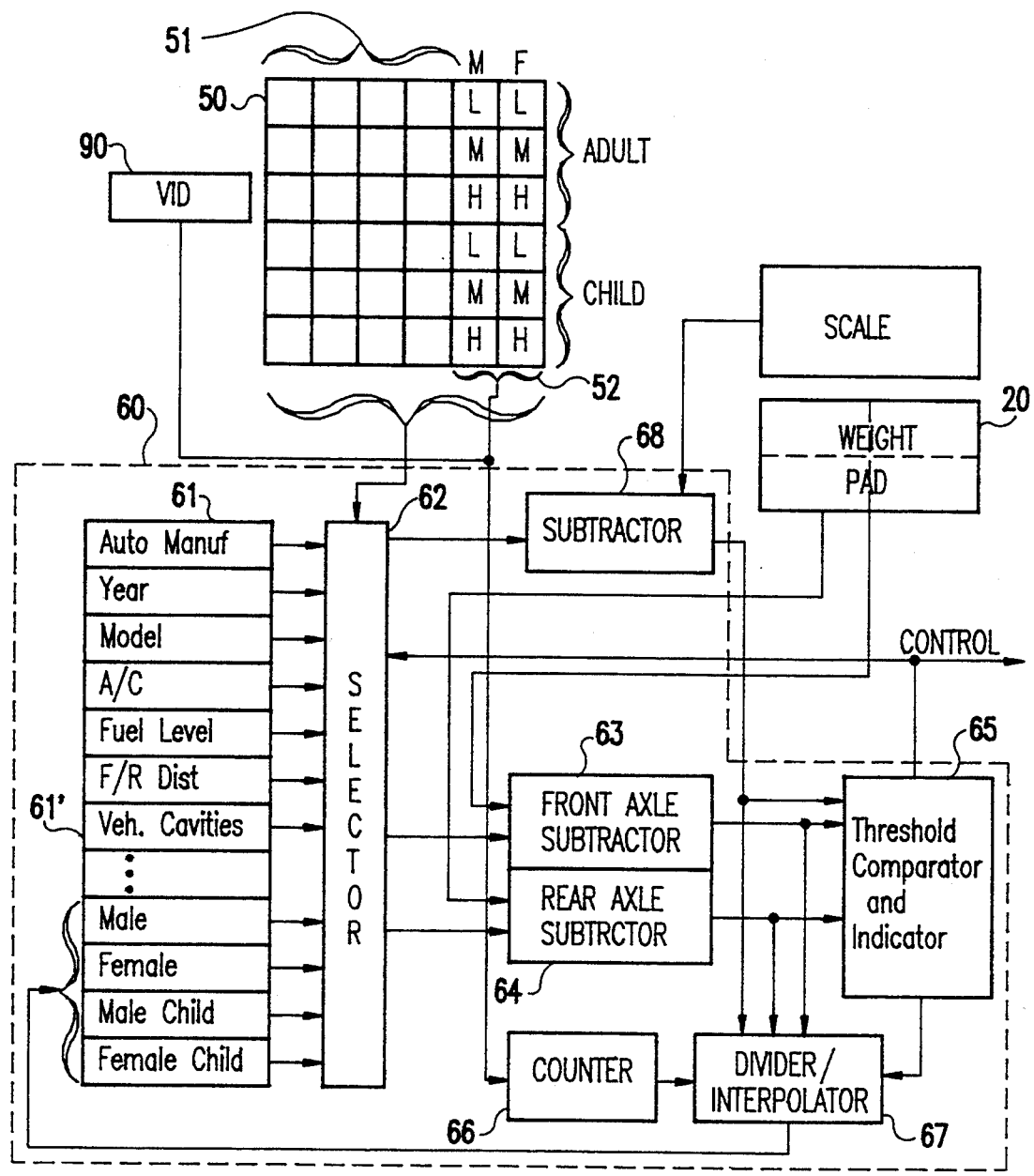
FIG. 2 is a schematic block diagram of the implementation of the invention shown in FIG. 1.

More specifically, and with reference to FIG. 2, keyboard 50 and the functional elements preferably provided by computer 60 are shown in greater detail. Keyboard 50 is preferably functionally divided into sections 51 and 52 for entering information concerning a vehicle and its occupants, respectively.

Section 51 is preferably dedicated to input of automobile identification information. This may be done by providing a key corresponding to each make and model of automobile or, particularly if a touch screen is employed, a hierarchical sequential display of selection menus can be presented to an operator. Vehicle identification information preferably includes at least the manufacturer, model/body type, and year. Some options such as air conditioning, which can significantly contribute to vehicle weight may also be provided. Since the presence of air conditioning may not be readily apparent from the vehicle exterior, such information is a candidate for input from auxiliary keyboard 70 which may be carried by other security personnel who can be positioned to see the interior of the vehicle for controls which indicate the presence of air conditioning and other optional equipment which may significantly affect vehicle weight.

Similarly, variations in vehicle weight due to variations in amount of fuel carried may be considered, if desired. Fuel amount may be done based on inspection of the vehicle fuel gauge or with a dipstick inserted into the fuel tank. If desired, other technologies such as acoustic sounding may alternatively be used. Therefore, the fuel amount selection is also an appropriate candidate for entry from auxiliary keyboard 70. Fuel amount weights for each gauge indication or dipstick measurement may also be stored in accordance with the make, model and year of the vehicle and retrieved as will be described below. In this regard, it should be appreciated that the largest fuel tanks in commercially available vehicles have a capacity of about twenty gallons. Therefore, if all fuel tanks are assumed to be half full (and at about six pounds per gallon), the maximum weight error would be about sixty pounds due to variations in amount of fuel carried. Therefore, if screening is to be done at an excess weight threshold of one hundred pounds, fuel weight variation need not be considered under this or a similar assumption.

Keyboard section 52 is preferably arranged as a matrix reflecting combinations of occupant weight, sex and build (e.g. light, medium or heavy). The number of actuations of each key is preferably used to indicate the number of occupants in each category. Keys may also be provided in accordance with a variation of the invention which indicate left/right and seat position (e.g. front, center or rear) of each occupant of the vehicle. Again, if a touch screen is employed, a layout of the vehicle interior may be displayed to facilitate data entry regarding vehicle occupants. However, the form of the display is not essential to the practice of the invention but should be regarded as a perfecting feature thereof.

It is also preferred to provide a key to indicate completion of data entry and to initiate a determination of whether an excess weight is present. Alternatively, a system time-out could be provided to indicate completion of data entry after the lapse of a few seconds when no keys are actuated.

In accordance with an optional variation of the invention employing automated information gathering techniques, it is to be understood that vehicle identification could be performed by substituting an optical character or bar code reader arranged to read the characters on a vehicle identification plate now required on all motor vehicles and visible through the windshield and the optical character reader thus substituted for keyboard section 51. Likewise, various non-intrusive (e.g. optical) measurement techniques could be used to characterize occupants and other contents of the vehicle and substituted for keyboard section 52. If both of these techniques are adopted, the invention could be made to operate and the screening methodology carried out in an unattended manner.

Computer 60 preferably provides for memory access selection, schematically depicted by selector 62 and preferably implemented in the form of a look-up table which may be readily modified to include different types of information which may be used depending on the amount of detail to be considered in the screening process. Memory 61 is also provided to contain weight values for each selection which can be made from keyboard 50 (or auxiliary keyboard 70), preferably as random access memory or hard disk storage for speed of access.

The computer 60 also provides at least one subtractor 68 but at least two such subtractors 63, 64, may be optionally provided for front and rear axles of the vehicle to facilitate adaptive alteration of information stored in memory 61, each including a register which initially receives a weight value from weight pad 20 and/or load cells 20' and an arithmetic unit capable of subtracting a digital value from a digital value in the register and replacing the value in the register with a new value. Additional subtractors may be provided for left and right weight distribution, as well, if desired. Thus, with each input to the computer from either keyboard 50 or auxiliary keyboard 70 (and/or VID 90), a weight value is selected from memory and subtracted from the actual weight of the vehicle. The weight value remaining (e.g. in the register of the subtractor) is then output to a comparator 65 which performs a thresholding operation against a substantially arbitrary excess weight allowance (depending on the desired screening tolerance) and a Go/No-go indication returned.

Automatic control of power operated barriers may also be provided such as raising of a barrier when the weight comes within the preset weight tolerance or otherwise selectively controlling one or more barriers to direct a suspect vehicle to a location where additional screening and/or manual search may be performed. In this way, the screening system in accordance with the invention may be used to reduce the visibility of further search or screening operations and to enhance the efficiency with which other screening techniques such as nitrate detection may be employed. No indication of the Go/No go determination need be given by personnel and, in fact, using various automated measurement or feature recognition systems available in the art, as noted above, the screening apparatus of the invention may be operated in an unattended fashion. The vehicle, if determined to have an excess weight (or a weight which is reduced to such a degree as to indicate vehicle structural modification) may thus be automatically directed to a location where further screening or search may be discretely carried out.

It is also considered to be a perfecting feature of the invention to provide information in memory 61 indicating the volume of various hollow cavities in the structure of various vehicle types, as indicated at 61, particularly if only a single platform scale 20 is used. Since explosives and other materials to be detected have fairly characteristic densities, the detected excess weight can be compared against the volume of cavities in the structure of the vehicle to indicate the locations within the vehicle in which that excess weight could be concealed. Therefore, it is preferred, in this case, to provide a control input from the threshold comparator to the selector to access this information in accordance with the sensed or input vehicle type identification.

It should also be appreciated that if the subtraction is performed for each axle and possibly further subdivided by left and right sides of the vehicle, an indication of the location of excess weight may be similarly provided to security personnel. In either case, if further screening is performed by other techniques, such screening may be directed to a particular portion of a vehicle and may be thus made more effective. Similarly, if a manual search and inspection of the vehicle is to be made, that search may be expedited by limitation to a particular portion of the vehicle.

The efficacy of the screening performed by the invention depends to some degree on the skill of the operator making keyboard selections of weight values or the accuracy of automated sensors which may be affected by ambient lighting conditions. In particular, the operator or sensor will be required to categorize the occupants of the vehicle within certain broad categories such as sex, age and build. Given that a vehicle entering a facility near where a public event is to be held is likely to have a plurality of occupants, it is necessary that the categorization of occupants be done with sufficient accuracy that a fairly accurate estimate of weight of each occupant may be made. While operators may be sources of error in this regard, even among trained personnel, each operator is at least likely to be highly consistent in their characterization of occupants of a vehicle although different operators may reach different conclusions as to proper category for particular vehicle occupants.

The variation of weight with body type is generally about ten pounds for visual categorization by sex, age and build by security personnel. Therefore, the excess weight variation due to occupants will be usually limited to about fifty pounds (or about half of the minimum explosive weight anticipated) for a vehicle with five occupants. Adaptive adjustment of weight values can readily reduce this variation significantly and often by more than half. Thus, for a vehicle with a single occupant the screening sensitivity or resolution of the system could be brought under five pounds per vehicle occupant. Variations in characterizations between operators or sensors can also be reconciled or corrected by adaptive adjustment of weight values stored in memory and retrieved for subtraction. While the particular adaptive technique used is not critical to the practice of the invention, those skilled in the art will be able to apply a suitable technique based on the following descriptions of exemplary implementations.

Preferably, where only a single platform scale 20 is used, weight value variance may simply be divided by the number of occupants or apportioned by body size in divider 67. In order to provide convergence of the adaptive adjustment, it is also preferred that the adjustment provide for averaging of adaptive changes made, at least over a predetermined period by further division of the weight variance. Then new weight values may be computed by simple addition and the new values stored in the appropriate portion of memory 61.

Where discrimination by location within the vehicle is available by use of plural scales or additional load cells, each operator entry regarding an occupant of the vehicle is counted by counter 66 which is preferably articulated in the same manner (e.g. front/back, left/-right) as the subtractors 63, 64. When the excess weight of the vehicle comes within tolerance or, especially, if the excess weight becomes slightly negative it can be assumed that there are very few contributions to measured vehicle weight other than the vehicle, itself, and the occupants. In such a case, the weight value in memory may, for various categorizations of occupants entered by the operator, be refined to provide an estimate of increased accuracy for each category.

For example, if the computed excess weight of the vehicle becomes negative by, for example, twenty pounds, the vehicle weight distribution varies by, for example, 3% from known values and toward the front of the vehicle, and the operator has entered information indicating the occupants to be a male and female adult, both of medium build, in the front seat and a female child in the rear seat, it will be evident that the body type of some occupant of the vehicle has been incorrectly assessed by the operator.

In such a case, various combinations of occupant locations and categories may be evaluated to determine the manner in which the error should be allocated, preferably by a look-up table in view of the relatively small number of possible combinations of categories, seat locations and measured weight distribution variations. The look-up table may then return empirically determined fractional values to a divider/interpolator 67 to provide a correction for each of the categories entered by the operator. The divider/interpolator thus apportions the negative excess weight among the occupants and computes a corrected value of body weight for each category of vehicle occupant which is then substituted for the value in memory 61. Thus, an accurate weight estimate will converge for each body type selectable by the operator regardless of the operator's criteria for distinguishing between body types. Relatively long term variations in application of these criteria (e.g. over approximately one-half hour) by an operator or sensor will also be compensated.

It is an important aspect of this invention to discriminate candidates for adaptive alteration of weight value since it can readily be appreciated that if excess weight above the detection threshold is used for adaptive weight value adjustment, the sensitivity of the system will be impaired. Likewise, if the excess weight is sufficiently negative to suggest vehicle modification, that value would also be a poor choice for adaptive adjustment of weight values. Therefore it is preferred to screen candidate data for adaptive weight value adjustment to eliminate vehicles having more than two occupants or a single occupant where significant other vehicle contents are present and having an absolute value of excess weight no greater than one-half the detection threshold. The logic and numerical comparison to determine this criteria is extremely simple and readily implemented by those skilled in the art in view of this specification and additionally, this limitation of data greatly simplifies the interpolation which may be required to realistically allocate the excess weight value among occupants and contents of the vehicle.

It should be understood that the same technique applied to adaptive adjustment of estimates of occupant weight is also applicable to luggage as may be encountered in vehicles at border crossing checkpoints and the like. In this case, however, the amount and distribution of any excess weight may also infer the size and location of the particular luggage item which may contain it to expedite manual inspection or even if the excess weight is attributable thereto. Luggage may thus be readily isolated for further screening, if necessary.

In use, an operator can enter all pertinent data in a relatively few keystrokes such as a single keystroke for vehicle identification and a very few keystrokes for each occupant and location. Retrieval of weight values from memory, subtraction and threshold comparison may be performed almost instantaneously by computers of very modest processing power. The division of labor between two operators by means of one or more auxiliary keyboards 70 may also expedite the data entry process. Therefore, the screening of an automobile may be accomplished within the time usually required for issuance of a parking receipt for the driver and traffic is not significantly impeded.

The invention may be used under a variety of conditions and at an arbitrary degree of screening sensitivity as circumstances may dictate. For example, the invention may be used to screen for only large quantities of material such as explosives made from fertilizers or may be used to screen for weights comparable to that of a single weapon. Threshold comparison may be done for both positive and negative excess weights to detect vehicle modification. This possibility is particularly applicable to applications where theft is of concern. In terms of visibility, the system may be used to increase the effectiveness of manual searching by indicating possible locations where excess weight could be concealed even in an application where every vehicle was subjected to manual searching. Conversely, the system allows a suspect vehicle to be diverted for additional screening or inspection without alerting the driver to that determination. The system may be installed permanently or may be as portable as the scale or load cells, if the accuracy required permits the latter to be used alone in a particular application.

In view of the foregoing, it is clear that the invention provides a method and apparatus for screening vehicles quickly, conveniently and non-invasively for amounts of explosives smaller than those associated with terrorist activity and major damage in the preponderance of past instances of the same. The ability to discriminate at a weight of one hundred pounds or less also makes the invention applicable to the detection of contraband, such as controlled substances, or illegal immigrants at border crossing checkpoints. The invention may also be used to improve efficiency of utilization of other types of more expensive screening techniques and to reduce the visibility of security activities. Particularly, if manual inspection or search of a vehicle is deemed necessary based upon screening in accordance with the invention, such inspection or search is expedited by the indication of location of excess weight within the vehicle provided by the invention.

While the invention has been described in terms of a single preferred embodiment, those skilled in the art will recognize that the invention can be practiced with modification within the spirit and scope of the appended claims. For example, as an alternative to manual entry of vehicle identification information, an optical character recognition reader could be provided to read the vehicle license plate and return such information from a database containing vehicle registrations. Such a variation of the invention could then display the returned information to the operator for confirmation and thus provide for detection of vehicle bearing the license plates corresponding to another vehicle and an additional screening criterion.

Having thus described my invention, what is claimed as new and desired to be secured by Letters Patent is as follows:

1. In combination,
   at least one weight transducer for measuring a weight of a vehicle,
   data entry means for selecting vehicle identification information and categories of contents of said vehicle,
   a memory containing weight values for each selection available from said data entry means,
   means for retrieving weight values from said memory in response to said data entry means,
   means for computing an excess weight value in response to said weight transducer and at least one weight value, and
   means for adaptively altering weight values in said memory corresponding to categories of vehicle contents.

2. The combination as recited in claim 1 wherein said data entry means includes a keyboard.

3. The combination as recited in claim 1 wherein said data entry means includes a touch screen of a display.

4. The combination as recited in claim 1 wherein said data entry means includes an optical sensor.

5. The combination as recited in claim 1 wherein said at least one weight transducer includes a single platform scale.

6. The combination as recited in claim 1 wherein said at least one weight transducer includes a single platform scale for front and rear portions of said vehicle.

7. The combination as recited in claim 1 wherein said at least one weight transducer includes a single platform scale for left and right portions of said vehicle.

8. The combination as recited in claim 1 wherein said means for adaptively altering weight values in said memory includes means for selecting candidate data for use in adaptively altering weight values.

9. The combination as recited in claim 8 wherein said means for selecting candidate data is responsive to data representing categories of contents of said vehicle selected with said data entry means.

10. The combination as recited in claim 8 wherein said means for selecting candidate data is responsive to said excess weight value being a fraction of a screening detection threshold.

11. A method of screening vehicles including the steps of
    determining a total weight of a vehicle and contents of said vehicle,
    retrieving a first weight value from memory based on an identification of the vehicle,
    retrieving at least one second weight value from memory based on occupants and other contents of said vehicle,
    deducting said first weight value and said second weight value from said total weight value to determine and excess weight value, and
    adaptively altering said at least one second weight value.

12. A method as recited in claim 11, wherein said step of adaptively altering said at least one second weight value includes the further step of
    selecting candidate data based on a number of occupants of said vehicle.

13. A method as recited in claim 11, wherein said step of adaptively altering said at least one second weight value includes the further step of
    selecting candidate data based on contents of said vehicle.

14. A method as recited in claim 11, wherein said step of adaptively altering said at least one second weight value includes the further step of
    selecting candidate data in response to said excess weight value being less than a fraction of a detection threshold value.

15. A method as recited in claim 11, including the further step of
    estimating an amount of fuel contained in said vehicle.

16. A method as recited in claim 15, wherein said estimating step includes an acoustic measurement.

17. A method as recited in claim 11, including the further step of
    retrieving vehicle cavity volume data from memory in response to said excess weight value.

* * * * *